United States Patent [19]

Pomeret

[11] 4,264,026
[45] Apr. 28, 1981

[54] APPARATUS FOR UNWINDING UNDERGROUND CABLES

[75] Inventor: Jean Pomeret, Anse, France

[73] Assignee: Societe Civile Particuliere Innovation Promotion S.C.I.P., Anse, France

[21] Appl. No.: 74,771

[22] Filed: Sep. 12, 1979

[30] Foreign Application Priority Data

Sep. 29, 1978 [FR] France .............. 78 28563

[51] Int. Cl.³ .......................................... B65H 51/32
[52] U.S. Cl. .................................. 226/176; 226/187; 226/190; 254/329; 254/333
[58] Field of Search ............... 226/176, 174, 177, 181, 226/186, 187, 190; 254/175.5, 175.6, 175.7, 287, 333, 216, 329

[56] References Cited

U.S. PATENT DOCUMENTS

| 1,481,886 | 1/1924 | Berg | 226/177 X |
|---|---|---|---|
| 1,700,736 | 2/1929 | Brennan | 226/187 |
| 2,525,590 | 10/1950 | Collins | 226/186 X |
| 2,603,343 | 7/1952 | Payne | 226/186 X |
| 3,014,628 | 12/1961 | Littlehale | 226/177 |
| 3,310,210 | 3/1967 | Reib | 226/187 X |
| 3,459,354 | 8/1969 | Land et al. | 226/177 |
| 3,473,715 | 10/1969 | Shuey, Jr. | 226/187 X |
| 3,791,564 | 2/1974 | Hugonin | 226/176 X |
| 4,033,496 | 7/1977 | Rolfe | 226/176 X |
| 4,053,092 | 10/1977 | Edwards | 226/181 X |

FOREIGN PATENT DOCUMENTS 473996  3/1929  Fed. Rep. of Germany ........... 226/176

*Primary Examiner*—Stanley N. Gilreath
*Attorney, Agent, or Firm*—Karl F. Ross

[57] ABSTRACT

An apparatus for unwinding underground cables includes a framework chassis which is open ended and open bottomed and rests on the ground such as a trench bottom. Mounted on the chassis are horizontal support rollers which support the horizontal cable as it is propelled through the chassis by a peripherally grooved driven pulley applied against the upper side of the cable. The pulley is driven about a horizontal axis by an electric motor via a gearbox. The chassis carries vertical guide rollers on either side of the cable to constrain it to a given path. The guide rollers on one side are movable to permit release of the cable from that path when a support arm carrying the pulley, gearbox and motor is pivoted upwardly, by manual action on a pivotable handle, to lift the pulley off the cable.

12 Claims, 2 Drawing Figures

APPARATUS FOR UNWINDING UNDERGROUND CABLES

FIELD OF INVENTION

The present invention relates to an apparatus for unwinding underground cables, in particular electrical cables.

BACKGROUND OF THE INVENTION

For unwinding electrical cables and laying them in a trench or channel, it is already known to use hauling gear for the purpose of replacing numerous workers who have to be assigned to this task, when the latter is carried out manually.

As drive means for the cable to be unwound, a relatively old known apparatus comprises an endless rubber belt located under the cable and retractable rollers which press against the upper part of the cable in order to apply the latter against the endless belt (French Pat. No. 1 473 248). The arrangement of the driving device: motor, reduction gearing, pulley for driving the endless belt and auxiliary pulley, is located in the lower part of this apparatus, which has two drawbacks:

on the one hand, the motor as well as other relatively delicate parts are inadequately protected from water, sludge and sand which are generally found at the bottom of trenches;

on the other hand, the arrangement of the driving device located in a lower position, as well as the base supporting this device, prevents direct laying of the unwound cable in the trench or channel intended to receive the latter or also the hauling of several cables in succession, without moving the apparatus. In fact, since the cable emerges through the upper part of the apparatus, it is necessary to place the apparatus off center in the trench for these operations and, to this end, to provide a recess on the side of the trench allowing the movement of the apparatus.

Other more recent apparatus are also known, in which the device for driving the cable to be unwound comprises one or more wheels provided with tires (French Pat. No. 2,259,460 and its Certificate of Addition 2,290,772). In the case of such apparatus also, the drive wheel or wheels are located below the cable, while a retractable pressure roller bears against the upper part of the cable. A frame protects the mechanical components, but this frame rests on the bottom of the trench over a considerable width and one thus encounters the same drawbacks, namely the impossibility of laying a cable which has been pulled along, or unwinding several cables in succession without moving the apparatus sideways.

OBJECT OF THE INVENTION

An object of the invention is to provide an apparatus in which the above mentioned drawbacks are avoided or at least mitigated.

SUMMARY OF THE INVENTION

According to the invention there is provided an apparatus for unwinding underground cables, comprising a chassis with two longitudinal sides, said chassis being able to rest on the ground on said longitudinal sides, and said chassis being open in its lower part, a plurality of support rollers to support the cable as it is unwound, said rollers having substantially horizontal axes and all being supported on one and the same side of the chassis, and a motor connected to a drive wheel for the cable and supported by a support pivotable about a horizontal axis with respect to the chassis, so that the periphery of said drive wheel can either be applied against the upper part of the cable, when the pivoting support is lowered, or moved away from the cable, when the pivoting support is raised.

Owing to this arrangement, which is the reverse of currently known constructions in the sense that the cable is driven by its upper part, after pulling, the cable can be released below the apparatus, which makes it possible to proceed with laying the cable, with its exact positioning in the trench or channel and possibly with the successive unwinding of several cables, without moving the apparatus.

Advantageously, not only the drive wheel, but also the driving arrangement supported by the pivoting support, in particular the motor, is located in the upper part of the apparatus, which ensures that it is protected from water, sludge and sand.

Preferably the apparatus also comprises a plurality of guide rollers having vertical axes, at least certain of which are able to move or can be detached in order to allow the release of the cable. For example, these latter rollers are able to move along cross members of the chassis, means being provided for immobilising them in the desired position. It should be noted that the possibility of adjusting these rollers not only facilitates the emergence of the cable after unwinding, but also precise guidance depending on the diameter of the cable, preventing the latter from escaping from the support rollers and drive wheel.

To ensure that the cable is driven without slipping and to prevent any damage to the cable, the drive wheel is advantageously provided on its periphery with a coating of elastomeric material. Preferably, this wheel is in the form of a type of pulley with a groove having a very open V-shaped cross section, in which the cable penetrates.

According to a particular embodiment of the apparatus, there are four support rollers and of the latter two have fixed axes located at the ends of the apparatus and the two others are supported by a common support mounted to oscillate about a horizontal axis, this pair of oscillating rollers being located below the drive wheel. The oscillating mounting provided in this way improves the drive, thus allowing the rollers to follow the deformations of the cable. Advantageously, the support rollers are made from thermoplastic material, so that they are able to withstand difficult working conditions (water, sludge).

According to another feature of the invention, the pivoting support for the motor is pivoted, at its end remote from its pivot axis, on a lever which is itself mounted to pivot on a rod associated with a device comprising a spring, the arrangement formed by said rod and this device comprising a spring being able to pivot about a pivot located in the lower part of the chassis of the apparatus. By means of this device:

on the one hand, by actuating the lever, the user may control either lowering of the pivoting support, in order to apply the drive wheel against the cable, or raising of the pivoting support, in order to move the wheel away from the cable;

on the other hand, the apparatus can be adapted to different cable diameters and also absorbs variations in the diameter of the same cable, by the action of the spring.

Other arrangements are also envisaged for adaptation to very varied cable diameters and the latter may advantageously be combined: the possibility of vertical adjustment of the horizontal pivot point of the support for the motor with respect to the chassis of the apparatus, the possibility of adjusting the pivot point of the lever along the said rod, the possibility of the vertical adjustment of the pivot point, with respect to the chassis, of the arrangement formed by said rod and the device comprising a spring, which is associated therewith.

Apart from the specific features and advantages mentioned in the aforesaid, it should be noted that the design of the unwinding apparatus according to the invention makes this apparatus compact, simple, reliable and convenient both as regards its use as well as its positioning in a trench or its removal.

BRIEF DESCRIPTION OF THE DRAWING

The invention will now be further described, by way of example, with reference to the accompanying drawing in which.

SPECIFIC DESCRIPTION

Figure 2:
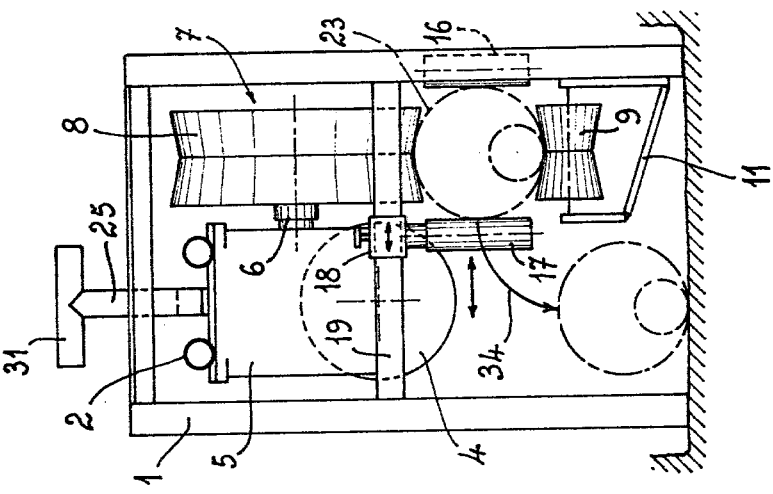
FIG. 2 is an end view of the apparatus in FIG. 1.

The machine illustrated comprises a tubular chassis 1, formed by two rectangular lateral frames connected to each other by a certain number of cross members. This chassis rests directly on the ground, more particularly on the bottom of a trench, by its lower parts.

The chassis 1 is completed by a tubular support 2, which is able to pivot about a horizontal pivot 3 located at one end of the apparatus and below which are suspended a three-phase electrical motor 4 having two directions of rotation and mechanical reduction gearing 5. The latter constitutes bevel gearing, the motor 4 being orientated longitudinally, whereas the output shaft 6 of the reduction gearing is orientated transversely.

Keyed on the output shaft 6 of the reduction gearing 5 is a metal wheel 7 coated on its periphery with a coating 8 of elastomeric material. The arrangement forms a type of pulley with a groove having a very open V-shaped cross section.

The lateral frame of the chassis 1 located on the same side as the wheel 7 supports four support rollers having horizontal axes. Two of these rollers 9 and 10, located at the ends of the apparatus, are held by supports 11 fixed rigidly to the uprights at the ends. The two other support rollers 12 and 13 are carried by a common support 14, mounted to oscillate about a horizontal pivot 15 connected to an intermediate upright of the chassis 1. All these support rollers 9, 10, 12 and 13 have a double frustoconical shape, as illustrated in FIG. 2.

The apparatus also comprises five cylindrical guide rollers having vertical axes. A first pair of guide rollers 16 and 17 is provided at one end of the apparatus. These two rollers and in particular the roller located in the central part of the apparatus, are supported by a support 18 which is mounted to move, transversely, along a cross member 19 of the chassis. A second pair of guide rollers 20 and 21 is likewise provided at the other end of the apparatus, which rollers are supported by supports able to move transversely along another cross member.

Finally, the last guide roller 22 is supported, without any possibility of adjustment, by the intermediate upright of the chassis to which the support 14 is pivoted.

The support rollers 9, 10, 12 and 13 as well as the guide rollers 16, 17, 20, 21 and 22 are made from thermoplastic material.

The cable 23 to be unwound passes through the apparatus over the support rollers 9, 10, 12 and 13, between the guide rollers 16 and 17 and between the guide rollers 20 and 21. To use the apparatus, the pivoting tubular support 2 is lowered so that the wheel 7 presses on the upper part of the cable 23, above the pair of support rollers 12, 13 mounted in an oscillatory manner.

In order to keep the wheel 7 pressed on the cable 23, while allowing for variations in the diameter of the cable and also in order to allow the release of the wheel 7, the following mechanism is provided:

the end of the tubular support 2 remote from the pivot point 3 is pivoted, about a pivot 24, to a bent lever 25 itself mounted to pivot about a pivot 26, on a substantially vertical rod 27. This rod 27 is extended downwards by a device 28 comprising a spring, the lower end of which is able to pivot about a pivot 29 connected to a plate 30 integral with the lower part of the chassis 1.

Figure 1:
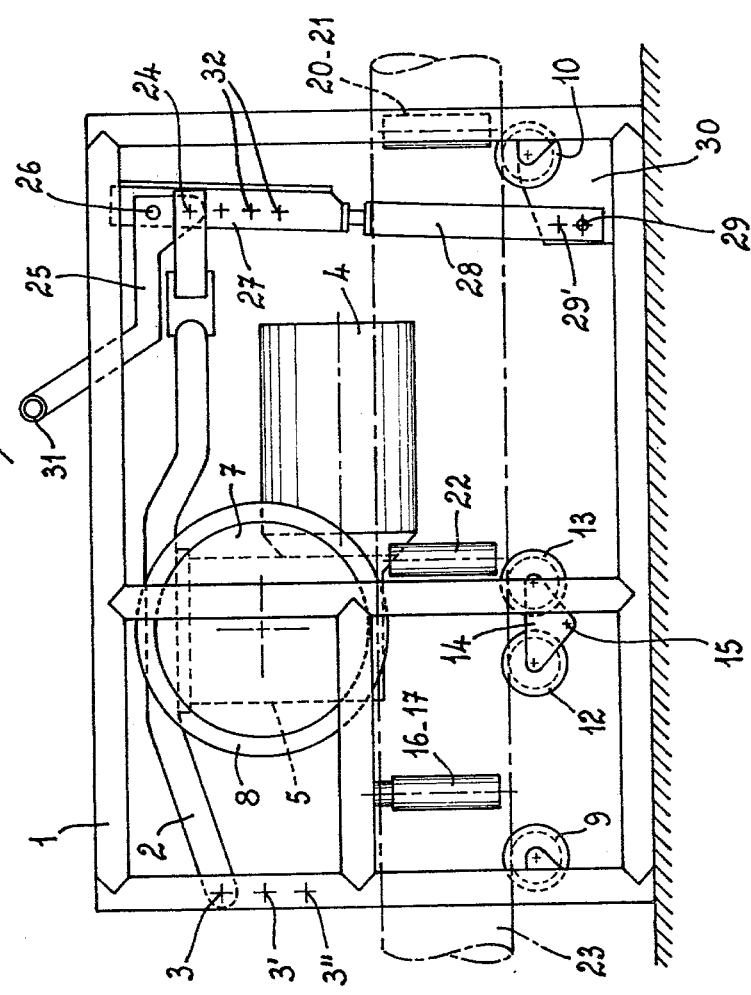
FIG. 1 is a side view of apparatus for unwinding underground cables formed according to the invention.

The free end of the lever 25 supports a handle 31 enabling it to be operated. In the position shown in FIG. 1, the support 2 is lowered, with the motor 4 and the reduction gearing 5, so that the wheel 7 is pressed by its covering 8 of elastomeric material against the upper part of the cable 23. In this position, the motor 4 may be supplied with current in order to rotate the wheel 7 in the desired direction and advance the cable 23, the latter travelling on the support rollers 9, 10, 12 and 13 while being guided, laterally, by the other rollers 16, 17, 20, 21 and 22. The spring of the device 28 allows a slight movement of the rod 27, of the lever 25 and of the support 2, in order to absorb the slight variations in diameter of the cable 23 and so that pressure is always exerted on this cable.

Adjusting means are also provided in order to facilitate the unwinding of cables of very varied diameter, as illustrated by FIG. 2:

several positions such as those indicated by 3' and 3" are possible for the pivot point 3 of the support 2, which may thus be adjusted vertically.

the rod 27 comprises a series of holes 32 also making it possible to locate the pivot point 26 of the lever 25 at different heights.

finally, a second position 29' is provided, on the plate 30, for the lower pivot point 29 of the device 28 comprising a spring.

When the lever 25 is actuated in the direction of arrow 33, it pivots about the pivot 26 thus causing raising of the support 2, with the motor 4 and the reduction gearing 5. The wheel 7 is thus moved away from the cable 23 and the latter is able to be disengaged. In order to allow the emergence of the cable, the two guide rollers 17 and 21 are moved along corresponding cross members of the chassis, in order to move them away from the cable. The latter may thus be released from the support rollers of the apparatus by a lateral movement, then laid on the bottom of the trench, as indicated by arrow 34 in FIG. 2. A new cable may thus be unwound, without it being necessary to move the apparatus.

For clarity of the explanation, we have considered the operation of a single apparatus, but it will be noted that when the invention is put into practice, several apparatus are generally located at intervals and supplied in parallel by the same electrical system in order to operate in synchronism, guide rollers supported by small supports being located between two consecutive apparatus in order to guide the cable correctly.

Purely as an example, it is pointed out that this apparatus may have a length of 0.85 meters, a height of 0.60 meters and a width of 0.40 meters, with a total weight of the order of 85 kg. These features render the apparatus portable and enable the latter to be put in position easily by two men, in a trench whose minimum width is 0.40 meters, while ensuring good stability for the latter. The average unwinding speed is approximately 25 meters/minute, with a motor whose power is of the order of 1 horse power and the apparatus may unwind cables having a diameter of up to 140 mm.

Naturally, the invention is not limited to the single embodiment of this apparatus for unwinding underground cables, which was described above by way of example. On the contrary, it includes all variations within the scope of the appended claims. For example, it is possible to modify the number and arrangement of the various rollers or to provide other arrangements for making the adjustments depending on the diameter of the cable to be unwound.

What is claimed is:

1. An apparatus for unwinding underground cable, comprising:
    a chassis adapted to be received in a trench and having a pair of longitudinal sides extending in the direction of the trench and resting upon the ground at the bottoms of said longitudinal sides, said longitudinal sides extending upwardly and said chassis being open downwardly at least at its lower portion toward the ground;
    a plurality of horizontally spaced support rollers mounted on said lower part of said chassis and supported thereon only from one of said sides and disposed between said sides, said support rollers being spaced from the other of said sides of said chassis by a sufficient distance to permit an unwound cable to pass between said support roller and said other side of said chassis;
    a drive wheel engageable with a cable on said support rollers and rotatable to unwind the latter cable while it is supported by said rollers;
    a motor operatively connected to said drive wheel for rotating same;
    a support for said motor and said drive wheel pivotally connected to said chassis about a horizontal axis; and
    means connected to said support for pivoting same relative to said chassis about said horizontal axis to selectively move said wheel toward and away from a cable on said support rollers.

2. The apparatus defined in claim 1 wherein said motor, said support and said axis are disposed at an upper part of said chassis between said sides.

3. The apparatus defined in claim 2, further comprising a plurality of guide rollers mounted on said chassis and having vertical axes, said guide rollers flanking a cable on said support rollers and including at least one movable guide roller positioned between a cable on said support rollers and said other side which is shiftable to release a cable on said support rollers and permit it to pass between said support rollers and said other side.

4. The apparatus defined in claim 3, further comprising a cross bar connecting said sides above said lower part of said chassis, said movable guide roller being mounted upon said cross bar for horizontal displacement thereon.

5. The apparatus defined in claim 3 wherein pairs of such guide rollers are provided at each end of said chassis and a further such guide roller between said ends of said chassis.

6. The apparatus defined in claim 1 wherein said drive wheel is provided with a covering of elastomeric material.

7. The apparatus defined in claim 6 wherein said drive wheel has a flattened V-section peripherally.

8. The apparatus defined in claim 1 wherein said support rollers include a respective support roller at each end of said chassis and a respective stationary member fixed to said one of said sides for supporting same, and a pair of support rollers mounted on a movable member and disposed below said drive wheel, said movable member having a horizontal axis that is oscillatable.

9. The apparatus defined in claim 8 wherein said support rollers are composed of thermoplastic material.

10. The apparatus defined in claim 8 wherein said support rollers have a double frustoconical shape.

11. The apparatus defined in claim 1, further comprising a lever having a pivot connected to said support and a fulcrum, a rod forming said fulcrum, and a spring connected to said rod, said rod being pivotally connected to the lower part of the chassis.

12. The apparatus defined in claim 1, further comprising means for adjusting the height of the pivot axis of said support on said chassis.

* * * * *